United States Patent
Kim et al.

(10) Patent No.: US 8,479,350 B2
(45) Date of Patent: Jul. 9, 2013

(54) AUTOMOBILE WIPER-BLADE

(75) Inventors: Jae Woong Kim, Daegu (KR); Tae Hun Kim, Daegu (KR); Kyung Min Kim, Daegu (KR)

(73) Assignee: CAP Corporation, Daegu (KR)

( * ) Notice: Subject to any disclaimer, the term of this patent is extended or adjusted under 35 U.S.C. 154(b) by 249 days.

(21) Appl. No.: 12/990,503

(22) PCT Filed: May 7, 2008

(86) PCT No.: PCT/KR2008/002551
§ 371 (c)(1),
(2), (4) Date: Oct. 30, 2010

(87) PCT Pub. No.: WO2009/133979
PCT Pub. Date: Nov. 5, 2009

(65) Prior Publication Data
US 2011/0047742 A1    Mar. 3, 2011

(30) Foreign Application Priority Data
Apr. 30, 2008   (KR) ........................ 10-2008-0040708

(51) Int. Cl.
*B60S 1/38*   (2006.01)

(52) U.S. Cl.
USPC ...................................... 15/250.32

(58) Field of Classification Search
USPC ........... 15/250.32, 250.43, 250.361, 250.201, 15/250.44, 250.451, 250.31
See application file for complete search history.

(56) References Cited

U.S. PATENT DOCUMENTS

| 7,207,082 B2 * | 4/2007 | Lee ............................ 15/250.32 |
| 2006/0021178 A1 * | 2/2006 | Verelst et al. .............. 15/250.32 |
| 2007/0234501 A1 * | 10/2007 | Ho et al. ................... 15/250.32 |

FOREIGN PATENT DOCUMENTS

| KR | 10-2005-0062585 | 6/2005 |
| KR | 20-0427934 | 10/2006 |
| KR | 10-0694517 | 3/2007 |
| WO | 2004-069618 | 8/2004 |
| WO | WO 2006088274 A1 * | 8/2006 |

OTHER PUBLICATIONS

International Search Report for PCT/KR2008/002551 mailed Dec. 24, 2008.

* cited by examiner

*Primary Examiner* — Mark Spisich
*Assistant Examiner* — Andrew A Horton
(74) *Attorney, Agent, or Firm* — Christopher Paul Mitchell

(57) ABSTRACT

A wiper device for vehicles is disclosed. The wiper device (1) for vehicles according to the present invention provides compatible standardized parts, such that the wiper device can be applied to various kinds of drive arms having different shapes and sizes. Therefore, the degree of freedom in design for the standardization of products can be increased, thus markedly reducing the production costs. Furthermore, thanks to the standardization of products, the present invention can be easily adapted for mass production. Hence, there are industrial effects in that products can be economically produced, distributed and spread.

10 Claims, 8 Drawing Sheets

AUTOMOBILE WIPER-BLADE

RELATED APPLICATIONS

This application is a 371 application of International Application No. PCT/KR2008/002551, filed May 7, 2008, which in turn claims priority from Korean Patent Application No. 10-2008-0040708, filed Apr. 30, 2008, both of which are incorporated herein by reference in their entireties.

TECHNICAL FIELD

The present invention relates, in general, to wiper devices which are in close contact with windshields of vehicles to remove raindrops, snow or other foreign substances and, more particularly, to a wiper device for vehicles which is constructed such that it can be applied to various kinds of drive arms having various standard sizes and shapes according to the kind of vehicle, thus realizing standardized production, thereby increasing the degree of freedom in design, and making economical production possible.

BACKGROUND ART

Generally, when windshields of vehicles are contaminated by dust or various foreign substances in the air or by rain or snow, the vision of drivers and passengers cannot be ensured, thus impeding safe driving. Therefore, wiper devices are typically provided on vehicles as means for removing rain water, snow or foreign substances on the windshields of the vehicles to provide the stable vision of drivers and passengers to ensure safe driving.

Wiper devices according to conventional techniques include a blade, which is made of soft rubber and has a predetermined length, the blade being in close contact with a windshield of a vehicle and moving thereon to wipe rain water, snow or foreign substances, a body spring, which is coupled to the upper end of the blade and has a predetermined curvature and a predetermined elasticity, and a clamp, which is coupled at a medial position to the body spring. The wiper devices further include a connector, which is rotatably coupled to the clamp, and a drive arm, which is connected at a first end thereof to a motor installed in the vehicle and is removably coupled at a second end thereof to the connector to transmit rotating force from the motor to the blade.

Here, the second end of the drive arm, which is coupled to the connector, is integrally provided with a hook part, which is curved to have a 'U' shape. The drive arm is coupled to the connector by locking the hook part to the connector.

In such a wiper device having the above-mentioned construction, when the wiper device is operated to remove rainwater, snow or foreign substances covering the windshield of the vehicle while traveling, the drive arm is rotated by the operation of the motor, which is installed in the vehicle body. Then, the blade assembly and the clamp, which has the connector coupled to the drive arm, are integrally rotated in conjunction with the drive arm, thus removing the rainwater, snow or foreign substances from the windshield.

Meanwhile, according to the kind of vehicles, drive arms have various sizes and shapes, which are different from each other. In the conventional techniques, in response to the various kinds of drive arms, various kinds of wiper devices having shapes for the exclusive use of the corresponding drive arms must be produced.

In detail, drive arms for vehicles are typically classified into a 'U'-shaped clip type drive arm, having a locking structure, a bayonet type drive arm, having a plug coupling structure, a pin type drive arm, which is provided with a protrusion on a sidewall thereof and has a coupling structure using the protrusion, a side hole type drive arm, which was developed by Bosch company and is fitted into the sidewall of a wiper device, and a top lock type drive arm, which has a coupling structure such that it covers the upper surface of a wiper device. As such, these drive arms have various shapes and sizes different from each other. In the conventional techniques, the wiper devices must be exclusively used with corresponding drive arms.

Therefore, with regard to the wiper devices, the standardization of products cannot be realized. Thus, there is a disadvantage in that the degree of freedom in design of products is low. As well, because wiper devices corresponding to various kinds of drive arms must be produced and marketed, production and distribution costs are increased.

DISCLOSURE

Technical Problem

Accordingly, the present invention has been made keeping in mind the above problems occurring in the prior art, and an object of the present invention is to provide a wiper device for vehicles which includes an adaptor assembly as a unit part having high compatibility, such that it can be applied to various kinds of drive arms having various standard sizes and shapes according to the kind of vehicles, thus realizing standardized production, thereby increasing the degree of freedom in design.

Technical Solution

In order to accomplish the above object, as an embodiment, the present invention provides a wiper device for vehicles, which includes: a blade, with rail springs provided in opposite edges of the blade, and a seating plate provided at a medial portion on an upper surface of the blade, parts of the seating plate protruding in opposite directions; and an adaptor coupled to the seating plate of the blade so as to be removable, the adaptor including a connector, which is connected to a drive arm coupled to a vehicle body, in which the adaptor includes: an insert coupling part provided in a lower surface of the adaptors, the insert coupling part fitted over opposite edges of the seating plate; and the seating plate includes coupling protrusions protruding in the transverse direction of the blade and insert protrusions that surrounds the opposite edges of the seating plate and to which the coupling protrusions are locked.

In this configuration, the connector includes a curved surface formed at one end of opposite ends of the upper plate such that a drive arm having a 'U'-shaped clip at the end is selective coupled to the curved surface and flange parts protruding from outer side plates.

Further, the connector has a slot formed at the opposite end to the curved surface such that a bayonet type drive arm having a strip-shaped end is inserted in the slot.

Further, the adaptor includes a pair of outer side plates vertically protruding from the upper surface, at a predetermined distance from each other, a hinge shaft connecting the central portions of the outer side plates, and front and rear outer pin holes formed through the outer side plates, before and behind the hinge shaft.

Further, the connector includes a hinge notch where the hinge shaft is fitted, and front and rear inner pin holes communicating with each other and corresponding to the front and rear outer pin holes, and at least any one of the front and rear outer pin holes and the front and rear inner pin holes is sized such that a pin type of drive arm is fitted.

Further, as another embodiment of the present invention, the adaptor includes a pair of guider plate vertically protruding at the medial portion on the upper surface, at a predetermined distance from each other, and hinge notches formed at a medial portion of the upper edge of each of the guide plates.

In this configuration, as another embodiment of the present invention, the connector further has: a pair of insert slots in which the pair of guide plates are inserted, respectively, and the hinge shafts that are fitted in the hinge notches are disposed into which the respective guide plates are inserted; a coupling end that is provided at one end of the connector in the longitudinal direction of the blade, where an elastic locking piece having elastic force in the vertical direction is provided, and that includes guide slots formed at the opposite sidewalls of the coupling end, with the front ends above the rear ends; and a cover for covering the coupling end, the cover sliding along the inclined guide slots while covering the coupling end and having an insert hole with a locking protrusion locking the elastic locking piece, on the upper surface.

Further, the elastic locking piece includes an elastic piece having an end connected to the coupling end and extending toward the front end of the connector, and a hook part integrally formed with the other end of the elastic piece and having a triangular cross-section, and the locking protrusion is provided in the insert hole to be locked to one end of the elastic locking piece elastically fitted in the insert hole.

Further, the connector is coupled with a drive arm that includes a tap extending to the coupling end in contact with the upper surface and both sides.

Further, the connector is selectively coupled with a drive arm having a cap contacting with the upper surface and both sides of the connector.

The features and advantages of the present invention will be more clearly understood from the following detailed description with reference to the attached drawings. The terms and words used in the specification and claims are not necessarily limited to typical or dictionary meanings, but must be understood to indicate concepts selected by the inventor as the best method of illustrating the present invention, and must be interpreted as having meanings and concepts adapted to the scope and sprit of the present invention for understanding the technology of the present invention.

Advantageous Effects

The wiper device for vehicles according to the present invention provides compatible standardized parts, such that the wiper device can be applied to various kinds of drive arms having different shapes and sizes. Therefore, the degree of freedom in design for the standardization of products can be increased, thus markedly reducing the production costs.

Furthermore, thanks to the standardization of products, the present invention can be easily adapted for mass production. Hence, there are industrial effects in that products can be economically produced, distributed and spread.

DESCRIPTION OF THE ELEMENTS IN THE DRAWINGS

Figure 1:
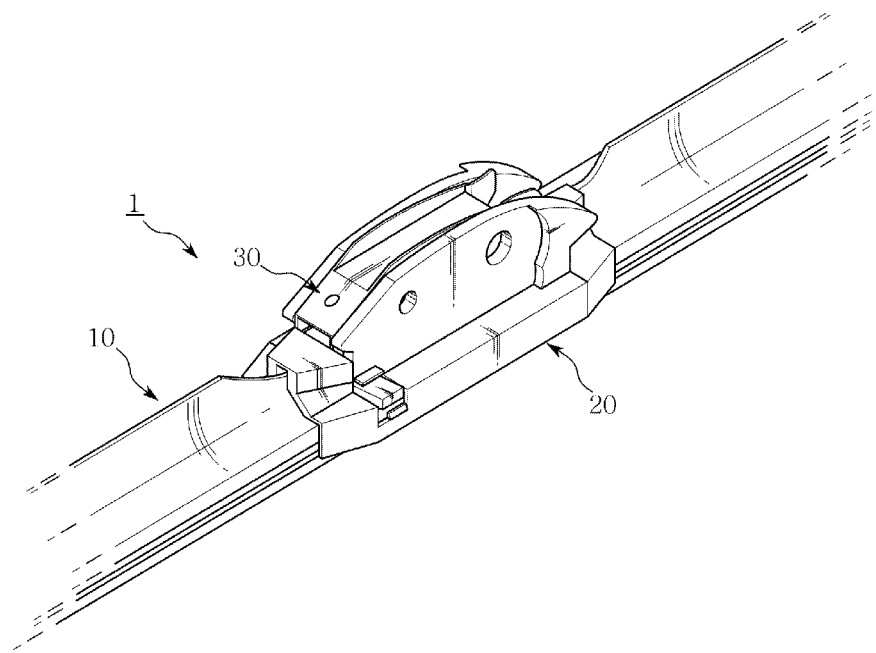
FIG. 1 is a perspective view of a wiper device for vehicles, according to a first embodiment of the present invention.

1: wiper device
10: blade
20,20': adaptor
30,30': connector
39: cover

BEST MODE

The above and other objects, features and advantages of the preset invention will be more clearly understood from the following detailed description.

Hereinafter, a wiper device for vehicles according to the present invention will be described in detail with reference to the attached drawings.

Reference should now be made to the drawings, in which the same reference numerals are used throughout the different drawings to designate the same or similar components. Furthermore, in the description of the present invention, an explanation of well-known functions and constructions will be omitted so that the present invention can be described more clearly.

Figure 2:
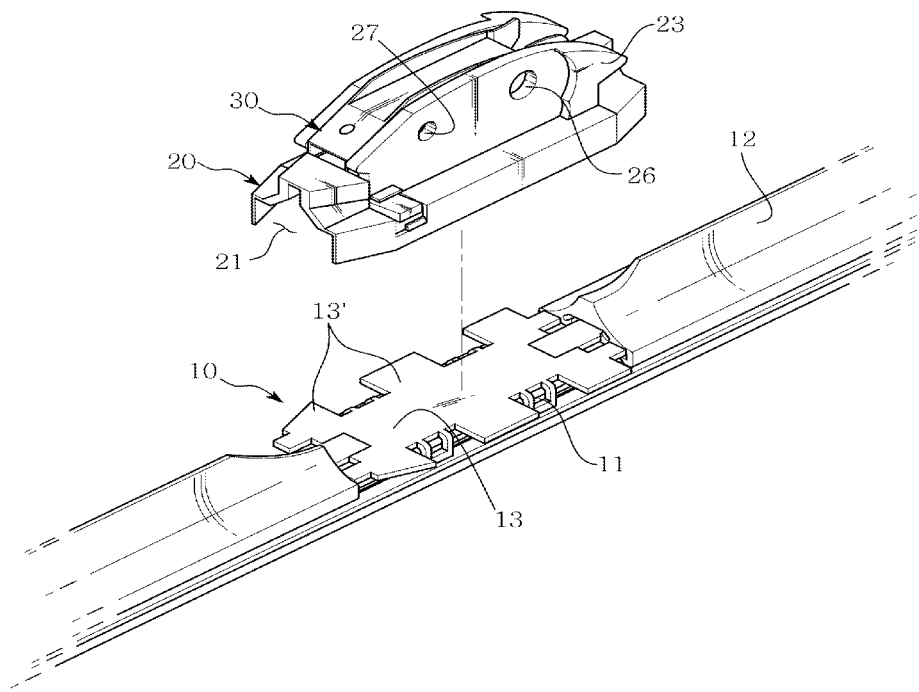
FIG. 2 is a perspective view illustrating the state in which a blade is separated from the wiper device of FIG. 1.
Figure 3:
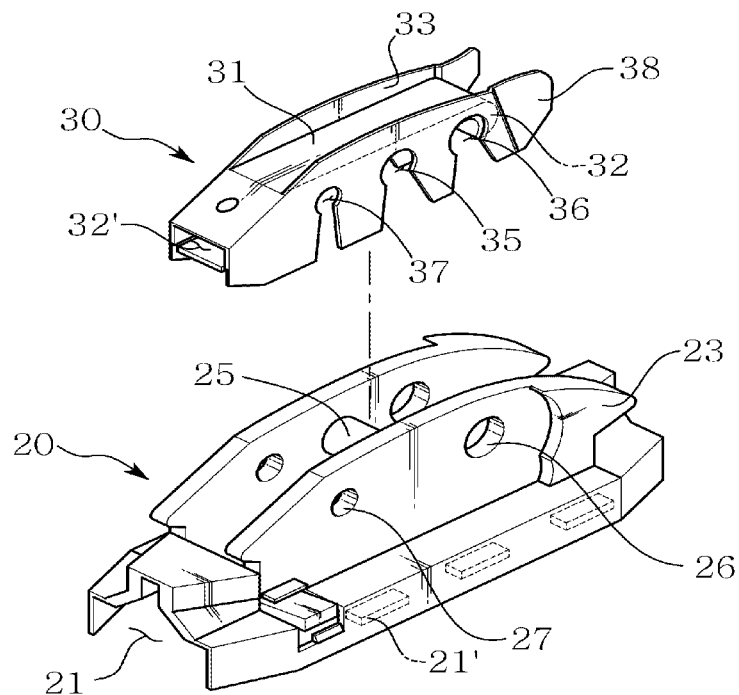
FIG. 3 is a perspective view illustrating a connector and an adapter of FIG. 1, which are separated from each other.

FIG. 1 is a perspective view of a wiper device for vehicles, according to a first embodiment of the present invention. FIG. 2 is a perspective view of a blade separated from the wiper device of FIG. 1. FIG. 3 is a perspective view illustrating a connector and an adapter of FIG. 1, which are separated from each other.

Figure 4:
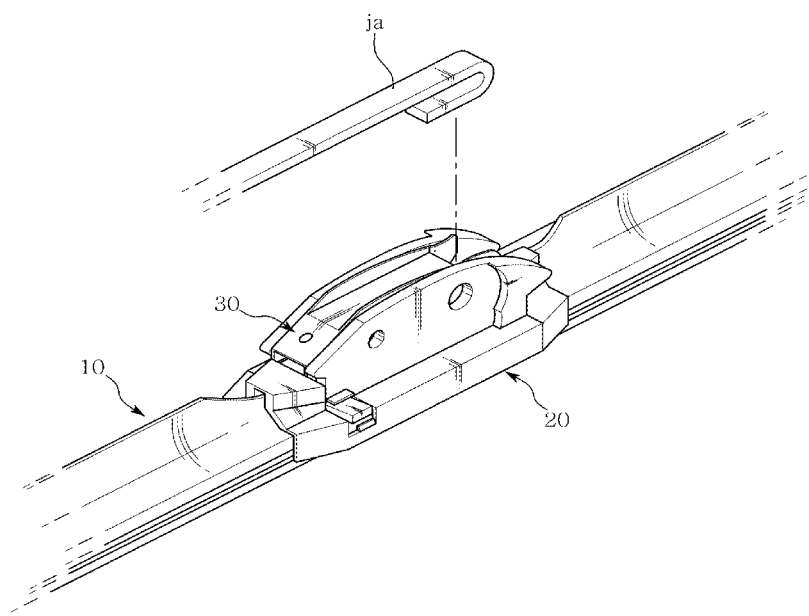
FIGS. 4 through 6 are perspective views showing the coupling of each of several representative drive arms having various shapes to the wiper device according to the first embodiment of the present invention.
Figure 5:
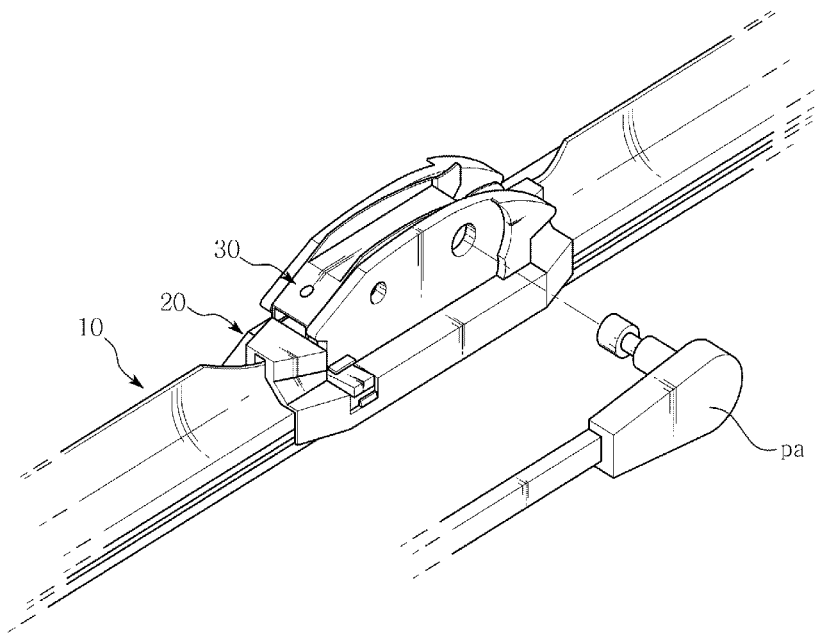
Figure 6:
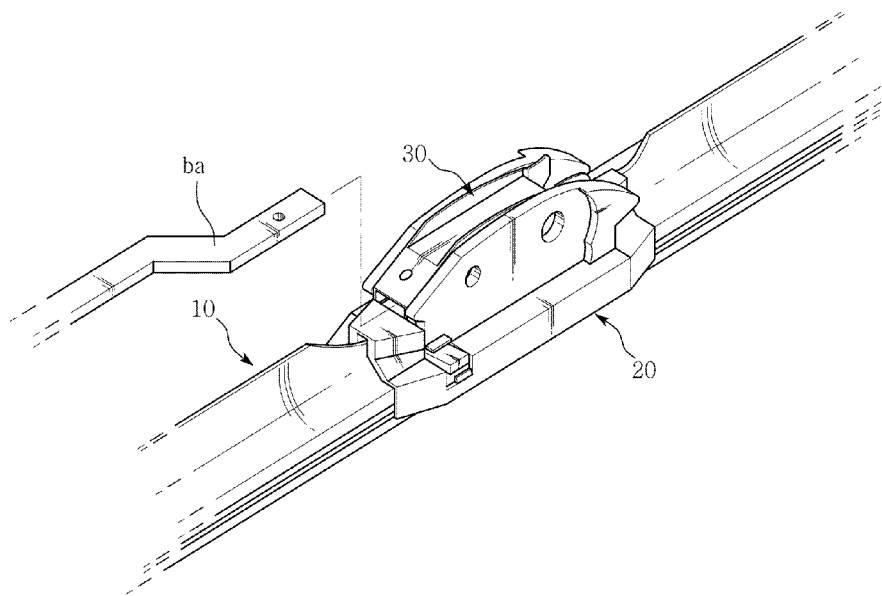

Furthermore, FIGS. 4 through 6 are perspective views showing the coupling of each of several representative drive arms to the wiper device according to the first embodiment of the present invention.

As shown in the drawings, the wiper device 1 for vehicles according to the present invention is removably coupled to a drive arm, which has a predetermined length and is connected to a drive source in a vehicle body to transmit rotary power. The wiper device 1 includes a blade 10, which is in close contact with a windshield of a vehicle, an adaptor 20, which is coupled to a medial portion of the blade 10, and a connector 30, which is coupled to the end of the drive arm in conjunction with the adaptor 20.

The blade 10 has in opposite edges thereof band-shaped rail springs 11, each of which has a predetermined elasticity. A seating plate 13, which has on opposite edges thereof coupling protrusions 13' to form a concavo-convex structure, is provided at a medial portion on the blade 10. Spoilers 12, which extend from the seating plate 13 in the longitudinal direction of the blade 10, are provided on the blade 10.

This construction of the blade 10 may be derived from well-known technique, and therefore further explanation is deemed unnecessary.

The adaptor 20 is mounted to the seating plate 13 of the blade 10 and is an element that enables the blade 10 to be coupled to various drive arms, shown in FIGS. 4 through 6, in conjunction with the connector 30.

Figure 13:
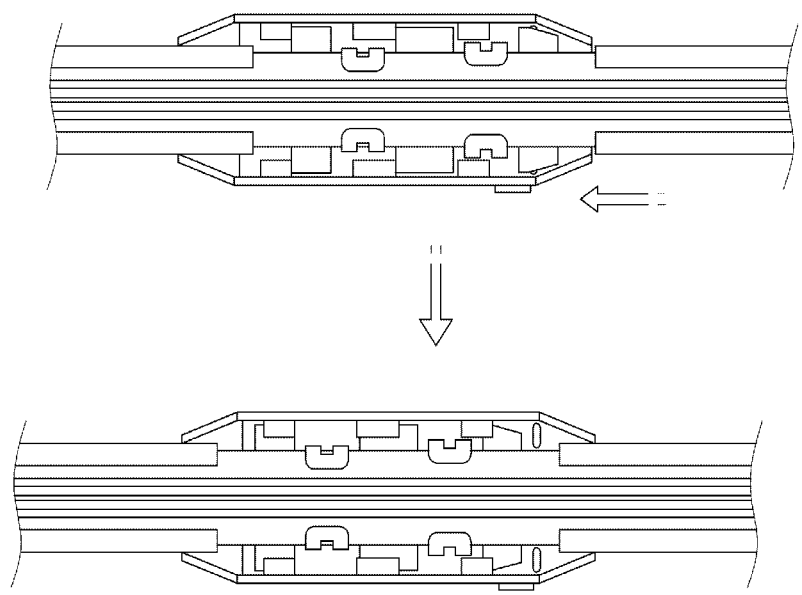
FIG. 13 is bottom views of the wiper device to illustrate the assembly construction between the adaptor and the blade according to the present invention.

Referring to FIG. 13, the adaptor 20 has in the lower surface thereof an insert coupling part 21 for coupling with the seating plate 13. The opposite sidewalls of the insert coupling part 21 extend downwards to cover the opposite edges of the seating plate 13. Insert protrusions 21', which form concavo-convex structures, protrude from the inner surfaces of the opposite sidewalls of the insert coupling part 21 in directions facing each other. Here, the insert protrusions 21' are spaced apart from each other at predetermined intervals corresponding to the widths of the corresponding coupling protrusions 13' such that the coupling protrusions 13' can be inserted between the insert protrusions 21'.

To couple the adaptor 20 to the seating plate 13 using the insert coupling part 21 having the above-mentioned structure, the insert protrusions 21' and the coupling protrusions 13' are disposed such that they alternate with each other. Subsequently, the seating plate 13 is pushed into the insert coupling part 21, and the adaptor 20 and the seating plate 13 are moved in opposite directions. Then, the coupling protrusions 13' of the seating plate 13 are locked to the insert protrusions 21', thus maintaining the coupling between the adaptor 20 and the seating plate 13.

Meanwhile, outer side plates 23, each of which has a planar shape, and which are spaced apart from each other by a predetermined distance, perpendicularly protrude from the upper surface of the adaptor 20, which is opposite the insert coupling part 21.

The outer side plates 23 are connected at centers thereof to each other by a hinge shaft 25. The hinge shaft 25 is fitted into hinge notches 35 in the connector 30, which will be explained later herein. Furthermore, front and rear outer pin holes 26 and 27 are formed in each outer side plate 23 ahead of and behind the hinge shaft 25, respectively.

Referring to FIG. 5, the front and rear outer pin holes 26 and 27 are features for coupling with a pin type drive arm, which is configured such that a protrusion is provided on a side surface thereof to have an insertion structure.

As shown in the drawings, the connector 30 includes an upper plate 31, which is disposed between the outer side plates 23 of the adaptor 20 and covers the open upper end of the outer side plates 23, and inner side plates 33, which extend downwards from the respective opposite edges of the upper plate 31 and are disposed adjacent to the respective inner surfaces of the outer side plates 23.

Furthermore, the hinge notches 35 are formed at medial positions in the respective inner side plates 33, so that the hinge shaft 25 of the adaptor 20 are fitted upwards into the hinge notches 35. Front and rear inner pin holes 36 and 37, corresponding to the front and rear outer pin holes 26 and 27 of the adaptor 20, are formed in each inner side plate 33 at positions ahead of and behind the corresponding hinge notch 35.

Meanwhile, a curved surface 32, to which a drive arm ja, having a 'U'-shaped clip, as shown in FIG. 4, is selectively locked, is formed on one of the opposite ends of the upper plate 31 of the connector 30. Flange parts 38, which support the respective opposite edges of the 'U'-shaped clip of the drive arm ja, are formed on respective ends of the outer side plates 23 adjacent to the curved surface 32.

Furthermore, a slot 32' is formed in the end of the connector 30 opposite the curved surface 32, so that a bent strip-shaped member, that is, a strip-shaped end of a bayonet type drive arm ba, is inserted into the slot 32' in an insert manner, similar to the coupling between a plug and a socket, as shown in FIG. 6.

Figure 7:
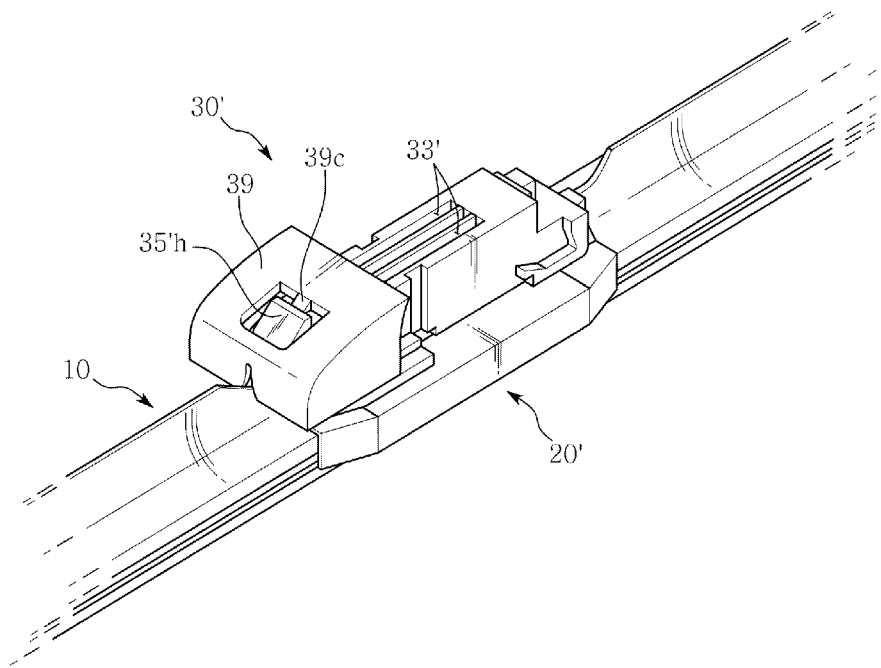
FIGS. 7 and 8 are perspective views showing the operation of a cover of a wiper device for vehicles, according to a second embodiment of the present invention.
Figure 8:
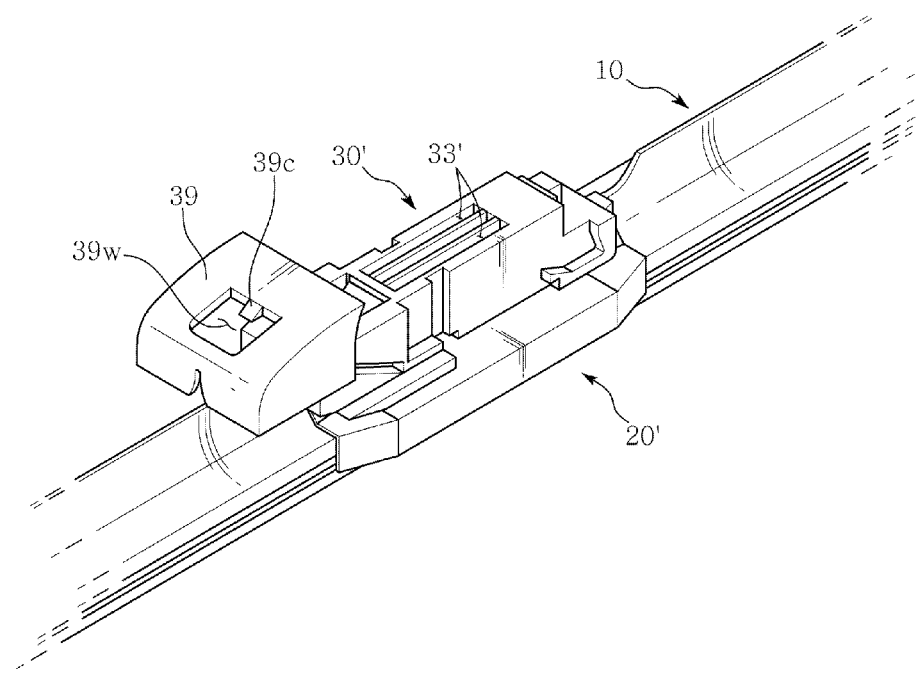
Figure 9:
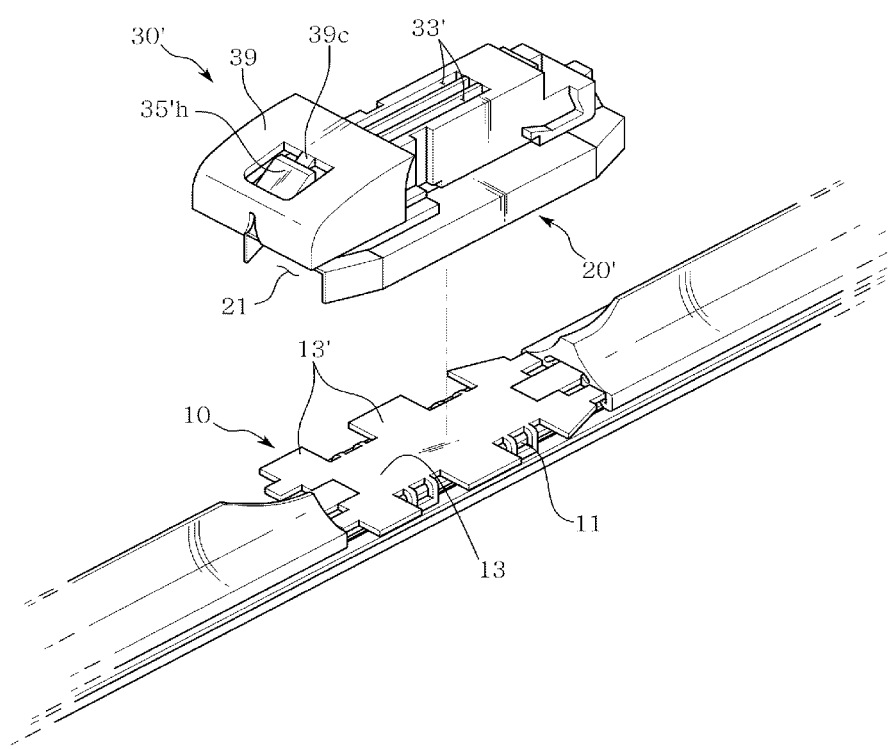
FIG. 9 is a perspective view illustrating the state in which a blade is separated from the wiper device of FIG. 7.
Figure 10:
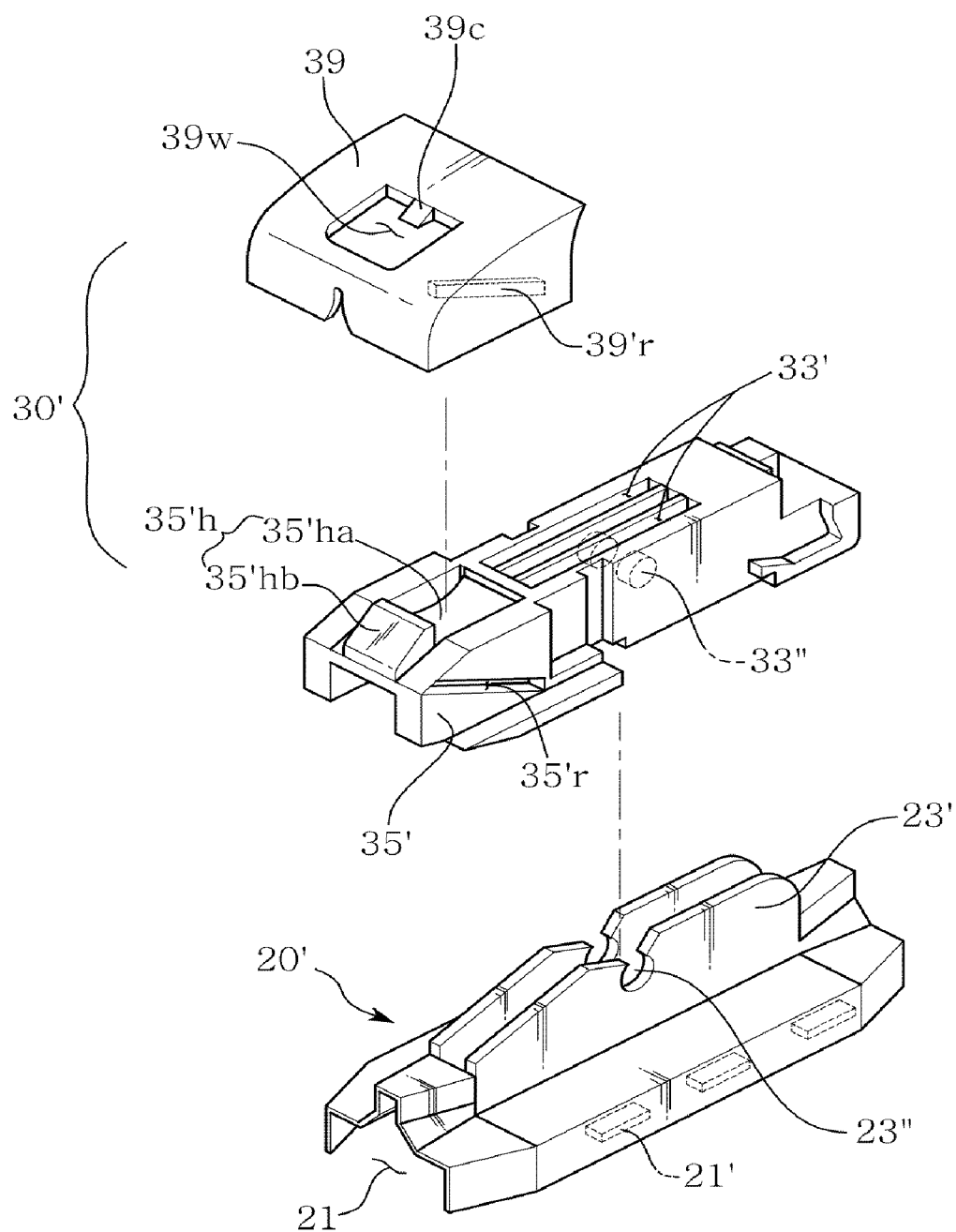
FIG. 10 a perspective view illustrating a connector, an adapter and the cover of FIG. 7, which are separated from each other.

FIGS. 7 and 8 are views showing a cover of a wiper device for vehicles, according to a second embodiment of the present invention. In detail, FIG. 7 illustrates a cover 39, which is assembled with a coupling end 35' of a connector 30' and is in a state in which it is hooked to an elastic locking piece 35'h. FIG. 8 illustrates the cover 39, which is in a state in which it is moved forwards from the connector 30' such that an end of a drive arm can be coupled to the connector 30'. FIG. 9 is a perspective view showing the state in which a blade is separated from the wiper device of FIG. 7. FIG. 10 a perspective view showing a connector, an adapter and the cover of FIG. 7, which are separated from each other.

Figure 11:
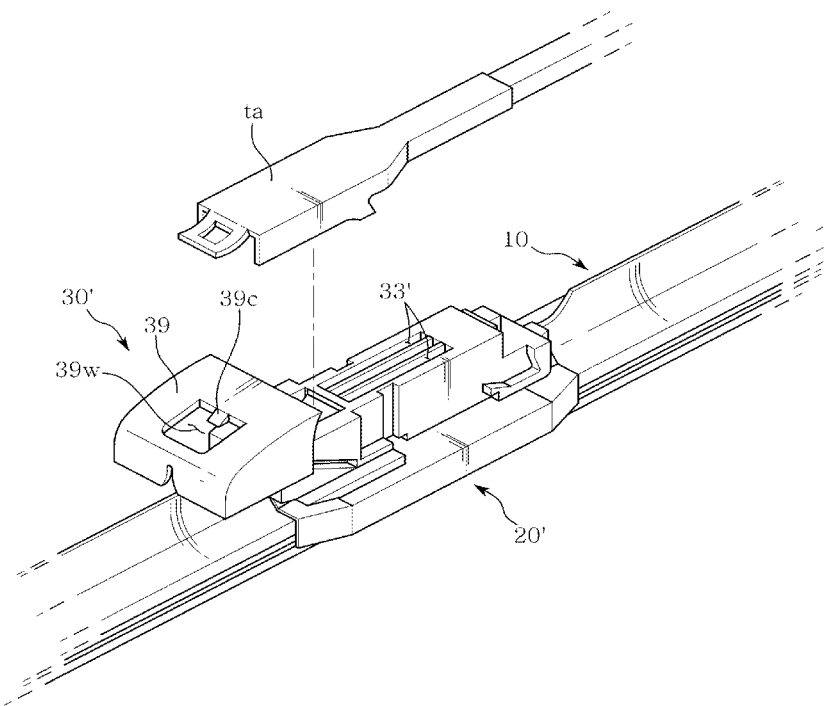
FIGS. 11 and 12 are perspective views showing the coupling of each of several representative drive arms having various shapes to the wiper device according to the second embodiment of the present invention.
Figure 12:
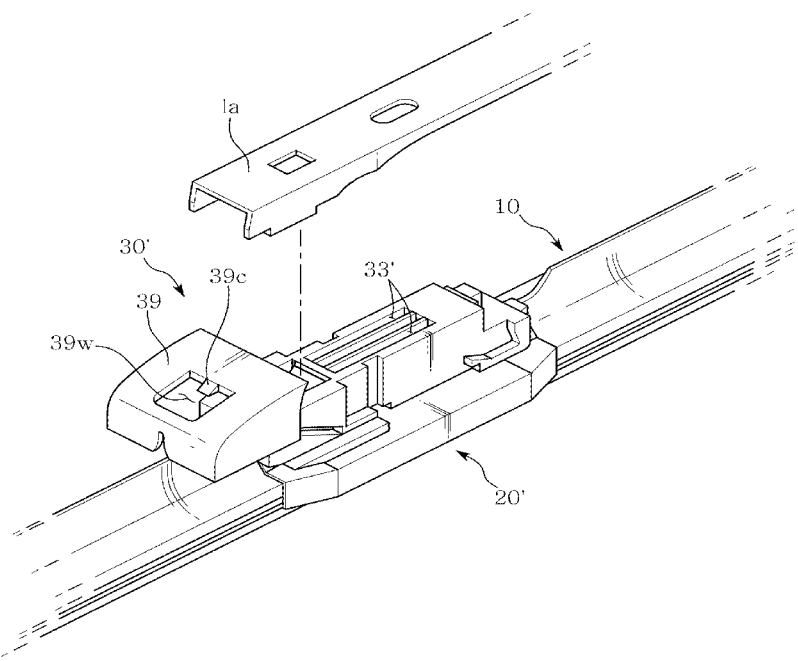

FIGS. 11 and 12 are perspective views showing the coupling of each of several representative drive arms having various shapes to the wiper device according to the second embodiment of the present invention.

As shown in the drawings, the wiper device 1 for vehicles according to this embodiment is removably coupled to a drive arm, which has a predetermined length and is connected to a drive source in a vehicle body to transmit rotary power. The wiper device 1 includes a blade 10, which is in close contact with a windshield of a vehicle, an adaptor 20', which is coupled to a medial portion of the blade 10, and a connector 30, which is coupled to the end of the drive arm in conjunction with the adaptor 20. In particular, as shown in FIGS. 11 and 12, the wiper device 1 can be selectively coupled to a drive arm ta, which has a tap on the end thereof, or a drive arm la, which has on the end thereof a cap, which contacts the upper surface and the opposite sidewalls of the connector 30'.

The blade 10 has in opposite edges thereof band-shaped rail springs 11, each of which has a predetermined elasticity. A seating plate 13, which has on opposite edges thereof coupling protrusions 13' to form a concavo-convex structure, is provided at a medial portion on the blade 10. Spoilers 12, which extend from the seating plate 13 in the longitudinal direction of the blade 10, are provided on the blade 10.

The blade 10 has the same construction as that of the blade of the first embodiment, therefore further explanation thereof will be skipped. Meanwhile, this blade 10 can be applied to the first embodiment as well as the second embodiment, so that it can be standardized as a unit part.

The adaptor 20' is mounted to the seating plate 13 of the blade 10 and is an element that enables the coupling of the blade 10 to the various drive arms, shown in FIGS. 11 and 12, in conjunction with the connector 30'.

In the same manner as the first embodiment, the adaptor 20' has in the lower surface thereof an insert coupling part 21 for coupling with the seating plate 13. Here, the opposite sidewalls of the insert coupling part 21 extend downwards to cover the opposite edges of the seating plate 13. Insert protrusions 21', which form concavo-convex structures, protrude from the inner surfaces of the opposite sidewalls of the insert coupling part 21 in directions facing each other. Furthermore, the insert protrusions 21' are spaced apart from each other at predetermined intervals corresponding to the widths of the corresponding coupling protrusions 13' such that the coupling protrusions 13' can be inserted between the insert protrusions 21'.

The coupling of the adaptor 20' to the seating plate 13 using the insert coupling part 21 having the above structure is the same as that of the first embodiment, and therefore further explanation will be omitted.

Meanwhile, guide plates 23', which are spaced apart from each other by a predetermined distance, perpendicularly protrude from the central portion of the upper surface of the adaptor 20 which is opposite the insert coupling part 21.

Hinge notches 23" are formed at medial portions in the respective upper edges of the guide plates 23', so that hinge shafts 33" of the connector 30', which will be explained later herein, are fitted into respective hinge notches 23" in the guide plates 23'.

The connector 30' has a rectangular shape and is formed through an injection molding process. The connector 30' has therein insert slots 33', into which the guide plates 23' are inserted in the vertical direction. The hinge shafts 33", which are fitted into the corresponding hinge notches 23", are provided in the respective insert slots 33'.

Furthermore, the coupling end 35', which is assembled with the cover 39, which will be explained later herein, is provided on one end of the connector 30 with respect to the longitudinal direction of the blade 10. The elastic locking piece 35'h is vertically provided on the coupling end 35'. Guide slots 35'r, which are inclined downwards from the front end thereof to the rear end, are formed in the respective opposite sidewalls of the coupling end 35'.

The elastic locking piece 35'h includes an elastic piece 35'ha, which is connected at a first end thereof to the coupling end 35' and extends a predetermined length towards the front end of the connector 30', and a hook part 35'hb, which is integrally provided on a second end of the elastic piece 35'ha and has a triangular cross-section. Due to this construction, as shown in the drawings, the hook part 35'hb of the elastic locking piece 35'h is inserted into an insert hole 39w in the cover and is elastically locked to a locking protrusion 39c of the cover.

Meanwhile, the cover 39 covers the coupling end 35' and is provided so as to be slidable along the guide slots 35'r. The insert hole 39w is formed through the upper surface of the cover 39, and the locking protrusion 39c, to which the elastic locking piece 35'h is locked, extends into the insert hole 39w.

The wiper device 1 for vehicles according to the second embodiment of the present invention, having the above-mentioned construction, can be selectively coupled to the drive arm ta, having the tap, which contacts the upper surface and the opposite sidewalls of the connector 30' and extends towards the coupling end 35', as shown in FIG. 11, or to the drive arm la, having the cap, which contacts the upper surface and the opposite sidewalls of the connector 30', as shown in FIG. 12.

Although the preferred embodiments of the present invention have been disclosed for illustrative purposes, those skilled in the art will appreciate that various modifications, additions and substitutions are possible, without departing from the scope and spirit of the invention. Therefore, such modifications, additions and substitutions must be regarded as falling within the bounds of the accompanying claims of the present invention.

The invention claimed is:

1. A wiper device for vehicles, comprising: a blade, with rail springs provided in opposite edges of the blade, and a seating plate provided at a medial portion on an upper surface of the blade, parts of the seating plate protruding in opposite directions; and an adaptor coupled to the seating plate of the blade so as to be removable, the adaptor including a connector, which is connected to a drive arm coupled to a vehicle body, wherein
   the seating plate as a separate element from the rail springs is coupled to the rail springs;
   the protrusions of the seating plate protrude in a transverse direction of the blade; and
   the adaptor includes: an insert coupling part provided in a lower surface of the adaptor, the insert coupling part fitted over opposite edges of the seating plate and insert protrusions in conjunction with sidewalls of the adapter wrap around the opposite edges of the seating plate and to which the coupling protrusions are locked.

2. The wiper device for vehicles according to claim 1, wherein
   the connector includes a curved surface formed at one end of opposite ends of an upper plate such that a drive arm (ja) having a 'U'-shaped clip at the end is selectively coupled to the curved surface and flange parts protruding from outer side plates.

3. The wiper device for vehicles according to claim 2, wherein the connector includes
   a slot formed at the opposite end to the curved surface such that a bayonet type drive arm having a strip-shaped end is inserted in the slot.

4. The wiper device for vehicles according to claim 1, wherein the adaptor includes a pair of outer side plates vertically protruding from an upper surface, at a predetermined distance from each other, a hinge shaft connecting central portions of the outer side plates, and front and rear outer pin holes formed through the outer side plates, before and behind the hinge shaft.

5. The wiper device for vehicles according to claim 4, wherein
   the connector includes a hinge notch where the hinge shaft is fitted, and front and rear inner pin holes communicating with each other and corresponding to the front and rear outer pin holes, and
   at least any one of the front and rear outer pin holes and the front and rear inner pin holes is sized such that a pin type of drive arm is fitted.

6. The wiper device for vehicles according to claim 1, wherein the adaptor includes a pair of guide plates vertically protruding at the medial portion on an upper surface, at a predetermined distance from each other, and hinge notches formed at a medial portion of the upper edge of each of the guide plates.

7. The wiper device for vehicles according to claim 6, wherein the connector further includes: a pair of insert slots in which the pair of guide plates are inserted, respectively, and hinge shafts that are fitted in the hinge notches are disposed into which the respective guide plates are inserted;
   a coupling end that is provided at one end of the connector in the longitudinal direction of the blade, where an elastic locking piece having elastic force in the vertical direction is provided, and that includes guide slots formed at the opposite sidewalls of the coupling end, with the front ends above the rear ends; and
   a cover for covering the coupling end, the cover sliding along the inclined guide slots while covering the coupling end and having an insert hole with a locking protrusion locking the elastic locking piece, on the upper surface.

8. The wiper device for vehicles according to claim 7, wherein the elastic locking piece includes an elastic piece having an end connected to the coupling end and extending toward the front end of the connector, and a hook part integrally formed with the other end of the elastic piece and having a triangular cross-section, and
> the locking protrusion is provided in the insert hole to be locked to one end of the elastic locking piece elastically fitted in the insert hole.

9. The wiper device for vehicles according to claim 7, wherein the connector is coupled with a drive arm that includes a tap extending to the coupling end in contact with the upper surface and both sides of the connector.

10. The wiper device for vehicles according to claim 7, wherein the connector is selectively coupled with a drive arm (la) having a cap contacting with the upper surface and both sides of the connector.

\* \* \* \* \*